United States Patent [19]

Nagano

[11] Patent Number: 4,786,071
[45] Date of Patent: Nov. 22, 1988

[54] PROTECTIVE DEVICE FOR A BICYCLE DRIVING CHAIN

[75] Inventor: Masashi Nagano, Izumi, Japan

[73] Assignee: Shimano Industrial Company Limited, Osaka, Japan

[21] Appl. No.: 72,138

[22] Filed: Jul. 10, 1987

[30] Foreign Application Priority Data

Jul. 21, 1986 [JP] Japan ................................ 61-111958

[51] Int. Cl.[4] .............................................. B62J 13/00
[52] U.S. Cl. .................................. 280/289 G; 474/140
[58] Field of Search .......................... 280/289 G, 160.1; 180/84; 474/140, 144; 74/608, 609

[56] References Cited

U.S. PATENT DOCUMENTS

| | | | |
|---|---|---|---|
| 582,096 | 5/1897 | Rominger | 474/144 |
| 2,101,172 | 12/1937 | Gegenheimer | 474/140 |
| 4,471,851 | 9/1984 | Kamiya et al. | 280/289 G X |

FOREIGN PATENT DOCUMENTS 260472 7/1949 Switzerland .

Primary Examiner—John J. Love
Assistant Examiner—Mitchell J. Hill
Attorney, Agent, or Firm—Stevens, Davis, Miller & Mosher

[57] ABSTRACT

A protective device for a driving chain stretched across a front gear and a rear gear of at a bicycle, which forms a guard body inserted below a driving side path of the chain at the driving side of the chain travelling from the rear gear to the front gear and having a chain guide surface for guiding axially outwardly part of the chain on the driving side path with respect to a rear bicycle wheel, the guard body is mounted on the bicycle frame through a mounting member, so that, even when the chain vibrates due to a bounce of the bicycle while running, the chain is prevented from contacting the rear wheel to be carried along with the rotation of the rear wheel.

4 Claims, 2 Drawing Sheets

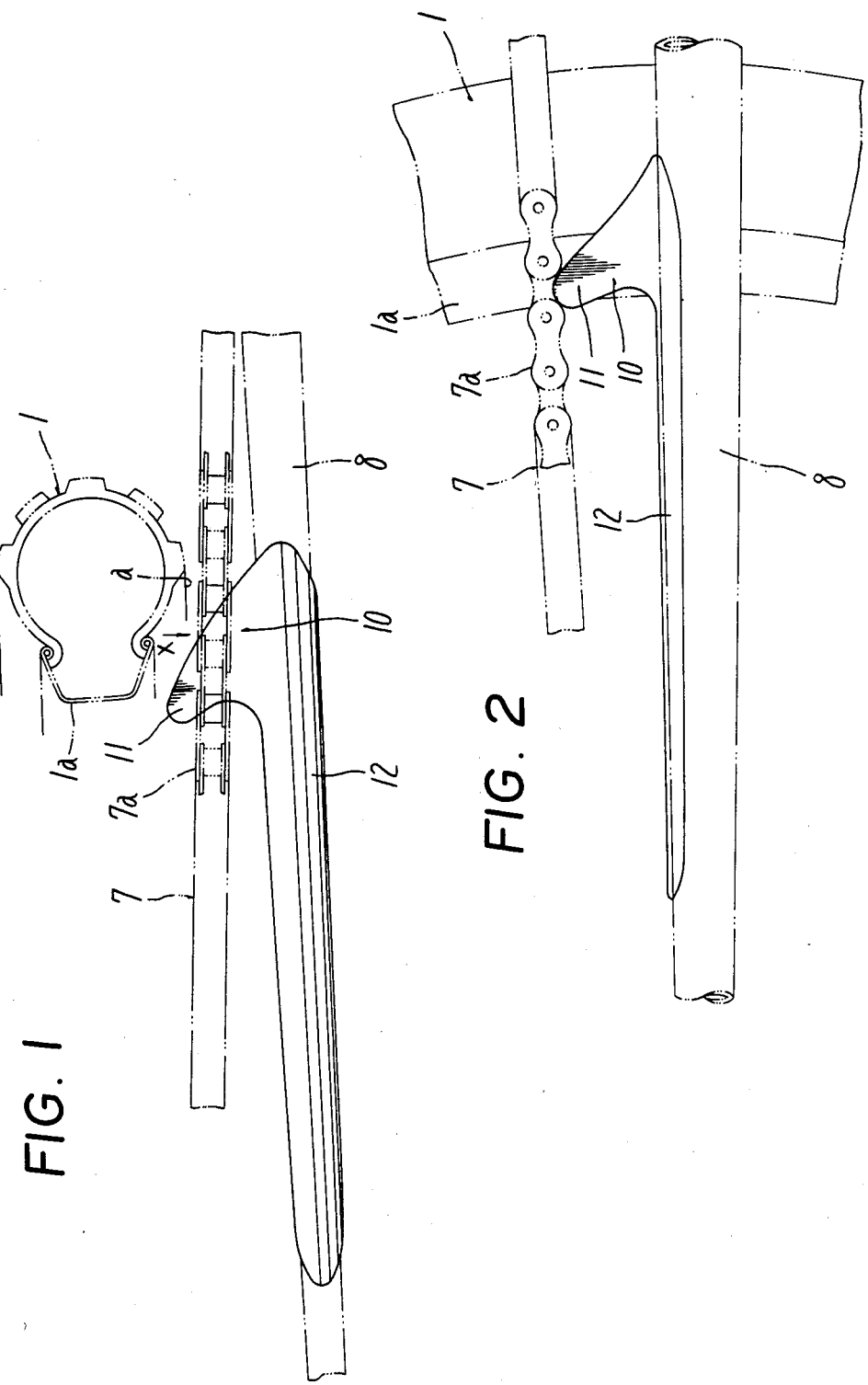

PROTECTIVE DEVICE FOR A BICYCLE DRIVING CHAIN

FIELD OF THE INVENTION

The present invention relates to a protective device for a driving chain at a bicycle, and more, to a protective device for a driving chain which is stretched across a rear gear mounted on a rear hub at the bicycle and a front gear mounted on the bicycle frame, so that the front gear is rotated to drive the rear wheel through the chain.

In greater detail, the present invention relates to a protective device which prevents the driving chain from contacting with the rear wheel during rotation thereof, because the chain transported from the front gear to the rear one vibrates during the running of the bicycle.

BACKGROUND OF THE INVENTION

Conventionally, in order to give a good appearance, a chain casing which covers the entire chain travelling path or a half chain casing which covers the chain travelling path at the driving or tension side only has been utilized. Recently, many bicycles using no chain casing have been put on the market due to weight reduction and low manufacturing cost of such bicycles.

Many bicycles of multistage speed change have been sold. For multistage rear gear assemblies, a rear derailleur having a tension spring for applying a chain tension to the driving chain is used.

When the chain tension is excessive, the speed change efficiency is problematical. In some cases, due to construction of the rear derailleur, the chain at the slack side, in other words, the chain transported from the front gear to the rear gear and subjected to no load (a driving force) is guided by a guide roller at a chain guide, at which time the guide roller interferes with a larger diameter rear gear to generate sounds. Hence, in order to solve the above problem, the tension of the tension spring is set low.

However, when the chain tension of the chain at the slack side is made smaller, the chain tension at the tight side or driving side also is reduced. Hence, when a cyclist rides the bicycle having a half chain casing or no chain casing on a downward slope by not-pedalling or by pedalling to apply a small load to the chain, the chain may vertically vibrate upon bouncing of the bicycle. In this case, when part of the chain at the driving side is caught by, for example, a tread of a rear wheel at the bicycle, there is a risk that the chain will be taken into the rotating direction of the rear wheel, that is, toward a chain stay.

Particularly, in a bicycle called the mountain bicycle, provided with multistage front gears and multistage rear gears and having wheels with relatively high treads, when the driving chain is stretched across a low speed front gear and a low speed rear gear and the cyclist rides the bicycle on a downward slope without pedalling, the aforesaid problem is quite remarkable.

SUMMARY OF THE INVENTION

An object of the invention is to provide a protective device for a driving chain at the bicycle, which reliably prevents part of the chain at the driving side from contacting with the rear wheel to be brought into the rotating direction thereof because the chain at the driving side vibrates upon bouncing of the bicycle.

The protective device of the invention for protecting the chain which is stretched across the rear gear at the rear hub and the front gear at the bicycle frame and transported by the rotation of front gear so as to drive the rear wheel, is provided (1) a guard body having a chain guide surface and (2) a mounting member for mounting the guard body on the bicycle frame. The guard body is positioned below the driving side path of the chain transported from the rear gear to the front gear by the rotation thereof and between the rear gears and the front grears. The chain guide surface guides the chain at the driving side axially outwardly of the rear wheel.

Accordingly, the chain at the driving side path is transported to keep out of the rear wheel, whereby there is no risk that the chain when not driven vertically vibrates to be caught by the rear wheel and brought into the rotating direction thereof when the bicycle bounces.

The above and further objects and novel features of the invention will be more fully apparent from the following detailed description when the same is read in connection with the accompanying drawings.

BRIEF DESCRIPTION OF THE DRAWINGS

FIG. 1 is a plan view of an embodiment of a protective device for a bicycle driving chain according to the invention, FIG. 2 is a front view of the FIG. 1 embodiment.

DETAILED DESCRIPTION OF THE INVENTION

Figure 3:
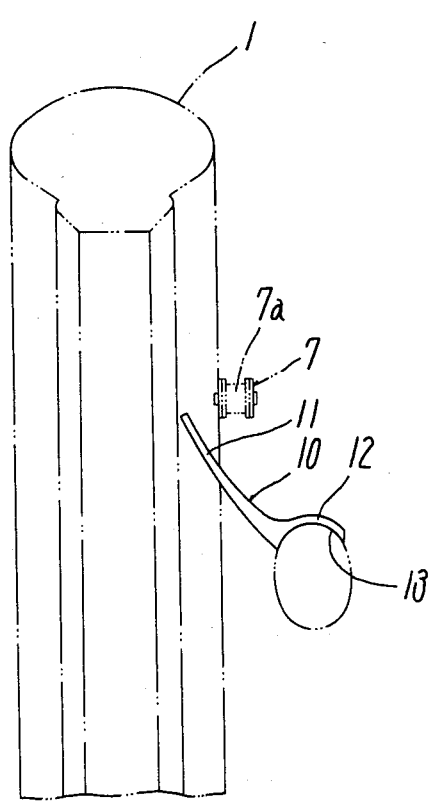
FIG. 3 is a side view of the FIG. 1 embodiment.
Figure 4:
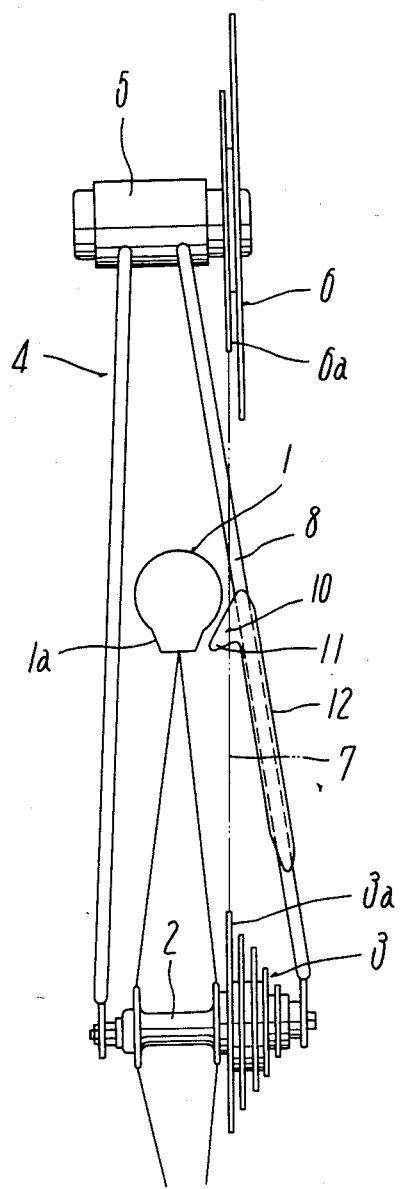
FIG. 4 is an illustration of the FIG. 1 embodiment assembled on a bicycle.

A protective device for a bicycle driving chain according to the invention, as shown in FIG. 4, is used mainly for a multistage speed change device which is provided with multistage rear gears 3 mounted on a hub 2 of a rear wheel 1 at the bicycle, multistage front gears 6 supported rotatably to a bottom bracket 5 of the bicycle frame 4, a driving chain 7 stretched across the rear gears 3 and the front gears 6, a front derailleur (not shown), and a rear derailleur (not shown), so that a tension spring provided at the rear detailleur applies tension to the chain. It should be noted that, the present invention is applicable also to a speed change device of one or both of a rear gear and a front gear having a single stage.

In addition, in FIG. 4, reference numeral 8 designates a chain stay extending rearwardly from the bottom bracket 5 and supporting together with a rear fork the hub 2 of the rear wheel 1. The chain stay 8 is disposed below the driving side of the chain travelling from the rear gear 3 to the front gear 6.

The embodiment of the protective device shown in FIGS. 1 through 4 comprises a guard body 10 positioned below the driving side path of the chain 7a transported from the rear gear 3 to the front gear 6 by the rotation thereof and having a chain guide surface 11 for guiding the chain 7a axially outwardly of the rear wheel 1 (in the direction of the arrow X); and a mounting member 12 integral with the guard body 10 and for mounting the guide body 10 on the chain stay 8 such that chain guide surface 11 is disposed below the chain 7a at the driving side.

In the aforesaid construction, the guard body 10 is formed in a plate-like shape and slanted from the inside of the chain 7a downwardly outwardly thereof and has a chain guide surface 11. Also, the guard body 10 is disposed such that the upper edge thereof is positioned inwardly and spaced by 1.5 mm or more from the outside surface of the rear wheel 1. Also, the guard body 10 is preferably disposed opposite to the side surface of a rim 1a at the rear wheel 1, but may alternatively be shifted to one longitudinal side of the bicycle. In addition, the guard body 10 may be disposed at the upper edge thereof below the driving side path of the chain 7a travelling in close proximity to the rear wheel 1, but may alternatively be disposed above the chain 7a.

It is preferable that the guard body 10 is formed of a synthetic resin of thin flexible metallic plate, so that the chain 7a at the driving side contacts with the chain guide surface 11 to deflect the guard body 10 so that a restoring force thereof is utilized to repel the chain axially outwardly from the rear wheel.

The mounting member 12 integral with the guard body 10 is elongate and semicylindrical in shape and has a curved surface 13 extending along the chain stay 8 and attached thereto to thereby cover the outer surface of chain stay 8, attaching surface 13 is mounted on the stay 8 by a mounting means, such as an adhesive double-coated tape or an adhesive. In addition, the mounting means may be a band member.

In the present invention constructed as described above, when the cyclist rides the bicycle on a downward slope without pedalling, the chain 7a at the driving side vibrates upon bouncing of the bicycle, at which time the chain 7a contacts with the chain guide surface 11 at the guard body 10 disposed below the chain 7a. As a result, the chain 7a is forcibly guided by the chain guide surface 11 axially outwardly of the rear wheel 1. Hence, the chain 7a can reliably be prevented from being taken into the rotating direction of the rear wheel 1 after contacting with the outer periphery of the rear wheel 1.

Accordingly, where the present invention is applied especially to a so-called mountain bicyble, as shown in FIG. 4, which stretches the chain 7 across the low speed front gear 6a and low speed rear gear 3a, when the cylist rides the bicycle on a downward slope without pedalling, even if the chain 7a at the driving side vibrates to hit the outer periphery of the rear wheel 1 due to a bounce of the bicycle, the chain 7a can reliably be prevented from being brought into the rotating direction of the rear wheel 1 and locked between the rear wheel 1 and the chain stay 8.

Also, the mounting member 12 having an elongate; semicylindrical shape, is mounted on the chain stay 8, thereby enabling the chain stay 8 to be protected from the chain 7. This configuration of the mounting member 12 can occupy a large mounting area to enable use of an adhesive double-coated tape or an adhesive.

Alternatively, the guard body 10 may be separate from the mounting member 12 and connected swingably or movably thereto so that the guard body 10 is adjustable in position with respect to the rear wheel 1.

The mounting member 12 may alternatively be mounted on a fixing member, such as a back fork or a seat tube, of the bicycle.

As seen from the above, the protective device for a bicycle driving chain according to the invention comprises a guard body 10 having the guide surface 11 and the mounting member 12 constructed as the described above which can reliably prevent the chain from being brought into the rotating direction of the rear wheel even when the bicycle bounces during the running.

While a preferred embodiment of the invention has been described above using specific terms, such description is for illustrative purposes only, and it is to be understood that changes and variations may be made of the disclosed embodiments without departing from the spirit or scope of the following claims.

What is claimed is:

1. A protective device for a driving chain stretched across a rear gear mounted on a hub of a rear wheel of a bicycle and a front gear mounted on a frame of the bicycle and transported by rotation of said front gear so as to drive said rear wheel, said device comprising a guard body adapted to be positioned along a driving side chain path at a driving side of said chain traveling from said rear gear to said front gear through rotation of said front gear, said guard body including a chain guide portion including a chain guide surface for guiding axially outwardly of said rear wheel said chain traveling on said driving side path and a mounting member for mounting said guard body on said frame of said bicycle; said mounting member comprising means for mounting said guard body on the frame of the bicycle between said rear gear and said front gear such that said chain guide surface is disposed below said driving side path of said chain, said chain guide portion having a plate-like shape and comprising means for extending slantwise relative to the bicycle from an inside portion of the chain at the driving side path thereof downwardly outwardly relative to a vertical direction of the bicycle, said chain guide surface being located at a surface of said chain guide portion oriented outwardly relative to the frame of the bicycle, whereby said chain traveling from said rear gear to said front gear is guided by said chain guide surface axially outwardly of said rear wheel, and wherein said mounting member comprises an elongate semicylindrical member comprising means for extending along said frame of said bicycle to cover the outer surface of said frame on which said mounting member is mounted.

2. A protective device as in claim 1 wherein said guard body is elastically displaceable with respect to said mounting member.

3. A protective device for a driving chain stretched across a rear gear mounted on a hub of a rear wheel of a bicycle and a front gear mounted on a frame of the bicycle and transported by rotation of the front gear so as to drive the rear wheel, said device comprising a guard body including a chain guide portion and a mounting portion, said chain guide portion including a chain guide surface and said mounting portion including an elongate, semi-cylindrical mounting member, said chain guide portion (i) having a plate-like shape, (ii) being connected to said mounting member adjacent one lateral side thereof, (iii) being oriented substantially perpendicular to said mounting member at its connection point thereto, and (iv) comprising means for extending slantwise relative to the bicycle from an inside portion of the chain at the driving side path thereof downwardly outwardly relative to a vertical direction of the bicycle, said chain guide surface being located at a surface of said chain guide portion oriented outwardly relative to the frame of the bicycle, whereby said chain guide surface is adapted to be positioned along and below said driving side path at a driving side of the chain traveling from the rear gear to the front gear through rotation of the front gear and to guide the chain axially outwardly of the rear wheel downwardly relative to a vertical direction of the bicycle.

4. A protective device as in claim 3, wherein said chain guide portion is elastically displaceable relative to said mounting member.

* * * * *